May 23, 1933. O. JUNKER 1,910,549
METHOD FOR INCREASING THE RATE OF HEAT ABSORPTION
OF BRIGHT SURFACE MATERIAL TO BE ANNEALED
Filed May 11, 1932
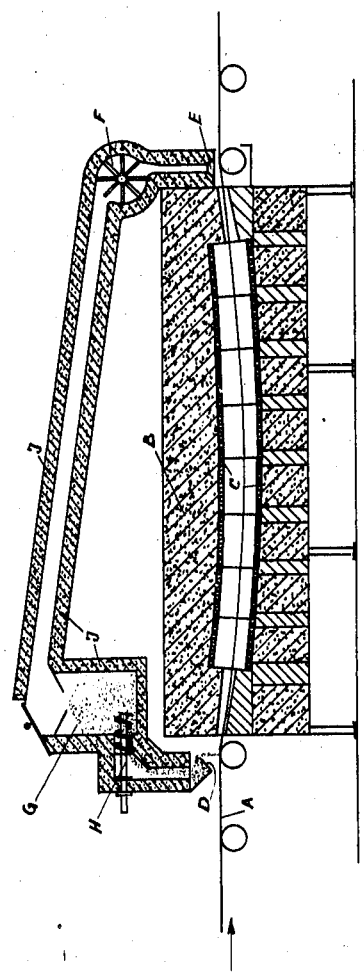
Inventor:
Otto Junker.

Patented May 23, 1933

1,910,549

UNITED STATES PATENT OFFICE

OTTO JUNKER, OF LAMMERSDORF, GERMANY

METHOD FOR INCREASING THE RATE OF HEAT ABSORPTION OF BRIGHT-SURFACE MATERIAL TO BE ANNEALED

Application filed May 11, 1932, Serial No. 610,695, and in Germany May 20, 1931.

I have filed an application in Germany May 20th 1931.

Material to be annealed, particularly metallic material is heated predominantly by radiation. The rate of heat absorption, apart from the temperature drop, is dependent on the radiation coefficient of the surface of the material $$C = k \; cal/m^2 h \left(\frac{°Abs}{100}\right)^4$$

For example, bright brass strip has a radiation coefficient of C=approx. 0.3 to 1. Heat absorbing, powdery substances, especially earths, graphite or soot have radiation coefficients of C=approx. 4 to 4.8. In otherwise the same proportions, merely the alteration or changing of the heat absorbing surface can thus increase many times the quantity of heat to be absorbed in a given unit of time. By sprinkling on the material to be annealed a thin layer of such powdery or dust-like earths—as on principle is known—the low heat radiation coefficient of the surface of the material, undesirable for the heat absorption capacity, can be approximated very closely to that of such earths, and thereby the heat absorption capacity within the given unit of time essentially increased. In practice, this means an increase of efficiency and therefore a better utilization of the furnaces.

According to this invention, use is made of this method, the principle of which is known, in the case of continuous operation metal strip furnaces in which the surface of the material to be annealed is particularly great in relation to the quantity of material being treated in the furnace, in that the heat absorbing substance is deposited in a thin layer on the surface of the material outside the furnace entrance and is removed therefrom outside the furnace exit.

The arrangement is shown in longitudinal section in the accompanying drawing. The strip material A to be annealed travels in continuous manner through the furnace B in the known way. Heating is predominantly by radiation from the inner walls of the furnace muffle C. In front of the furnace entrance is a shaking trough D, commanding the full width of the strip and permitting the lightest of thin dust layers of heat absorbing substance to fall on the strip in definite quantity. At the furnace exit, this dust is removed from off the material by suction through the pipe E. The fan forces the dust-like substance to the separator G, from the storage bin of which, it is conveyed by the worm H to the shaking trough to be used again. The storage bin as also all conduits are covered with heat insulating material J, which prevents wasteful loss of the heat absorbed by the dust during annealing.

Instead of dust-like substances being used for reducing the radiation coefficient of the surface of the material to be annealed, a suitable adhesive substance can be applied, which will adhere also to the underside of the strip, for example, graphite mixed with water, and can be removed from the strip by means of a wiping, washing or brushing device located at the furnace exit.

The method and the device constituting the subject of this invention can also be used for equalizing differences in the strip surface, which would otherwise involve irregular heating, for example, in the case of oil or oxide streaks, by covering the bright parts of the strip surface these can be closely approximated in the rate of heat absorption, to the dark places already existing.

Likewise, with continuous strip annealing furnaces, the method may be used for eliminating the otherwise very annoying and troublesome occurrence of undue heating along the edges of the strip, by the simple expedient of suitably covering the centre zone of the strip.

Having thus described my invention, I claim:

1. A method of increasing the rate of heat absorption of bright surface material as advanced through continuous annealing furnaces which is characterized in that a heat-absorbing substance is deposited in a thin layer on the surface of the material to be annealed, at the furnace entrance, and removed from the material, at the furnace exit.

2. A method, according to claim 1, in which the dust-like substance executes a complete circulation, in that at the furnace exit it is removed from the material by means of a suction device, and then delivered to a dust separator with storage bin, whence it is fed to the distributor for further use.

3. A method, according to claim 1, in which the entire dust-conveying and collecting plant is insulated so as to avoid loss of heat.

4. A method, according to claim 1, in which, the material being a strip use is made of an adhesive substance, which will adhere also to the underside of the strip.

5. A method, according to claim 1, in which the covering substance is applied in places as required, so as to achieve uniform heating of the entire surface.

In testimony whereof I affix my signature.

OTTO JUNKER.